United States Patent
Dulle

[15] 3,678,901
[45] July 25, 1972

[54] ROTATING BIRD PERCH

[72] Inventor: William J. Dulle, 1036 E. 6th Ave., Long Beach, Calif. 90810

[22] Filed: Dec. 30, 1970

[21] Appl. No.: 102,660

[52] U.S. Cl. ............................................................. 119/26
[51] Int. Cl. .......................................................... A01k 31/12
[58] Field of Search ........................................ 119/26, 17, 26

[56] References Cited

UNITED STATES PATENTS 1,998,787  4/1935  Nyhagen ............................. 119/26 X
2,731,949  1/1956  Arnould .................................. 119/26

Primary Examiner—Hugh R. Chamblee
Attorney—Fulwider, Patton, Rieber, Lee & Utecht

[57] ABSTRACT

A rotating bird perch having a platform which is rotatably mounted to a base and which mounts a bird support to which is attached one or more mirrors. The mirror rotates with the bird support so that a bird on the support is exposed to changing images in the mirror. The rate of rotation of the platform can be varied.

5 Claims, 5 Drawing Figures

Patented July 25, 1972 3,678,901

INVENTOR.
WILLIAM J. DULLE
BY Fulwider, Patton, Rieber,
Lee and Utecht
ATTORNEYS

3,678,901

ROTATING BIRD PERCH

BACKGROUND OF THE INVENTION

1. Field of the Invention

The present invention relates to a rotating bird perch.

2. Description of the Prior Art

A rotating bird perch has been advanced in the prior art to support and rotate a bird for the amusement of the bird and the entertainment of observers. However, the bird soon becomes accustomed to the continued rotation and the novel effect passes.

SUMMARY

According to the present invention a platform is rotatably mounted upon a base, and a bird support carried by the platform rotates with the base so that a bird on the support is amused by the rotation of the platform. In addition, a mirror is rotatable with the support, preferably being carried by the support, so that the bird not only observes his own image in the mirror, but also is subjected to changing images resulting from the rotation of the mirror relative to the surroundings. It has been found that the combination of rotation and changing reflections from the mirror is very amusing to the bird and therefore pleasing to its owner. The described arrangement tends to make the bird quite active and interesting to watch.

DESCRIPTION OF THE PREFERRED EMBODIMENT

Figure 1:
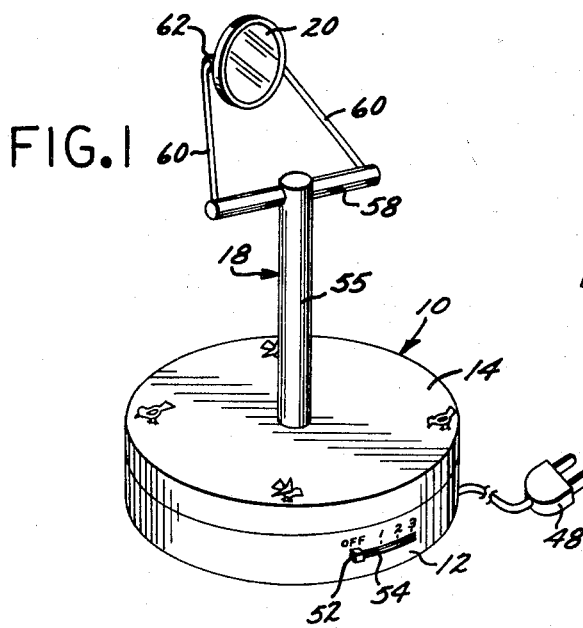
FIG. 1 is a perspective view of a bird perch according to the present invention.
Figure 2:
FIG. 2 is a top plan view of the bird perch of FIG. 1.
Figure 3:
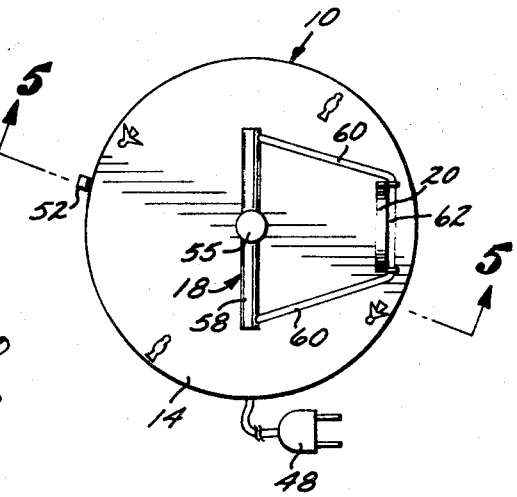
FIG. 3 is a front elevational view of the bird perch of FIG. 1.
Figure 3:
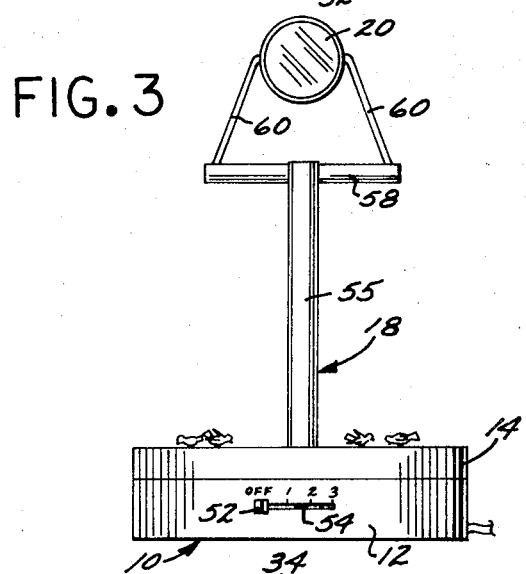
Figure 4:
FIG. 4 is a side elevational view of the bird perch of FIG. 1.

Referring now to the drawings, there is illustrated a rotating bird perch 10 comprising a circular base 12, a circular platform 14 arranged in overlying relation to the base 12, a drive means 16 operative to rotate the platform 14 relative to the base 12, a bird support 18 carried by and rotatable with the platform 14, and a mirror 20 rotatable with the support 18 so that a bird on the support 18 is exposed to changing images in the mirror 20.

The base 12 may be made of any suitable material but is preferably made of molded plastic and includes a bottom plate 22, a cylindrical wall 24 integral with the perimeter of the bottom plate 22, and a central support cone 26 of generally circular horizontal cross section, the cross section diminishing in an upward direction.

The upper end of the support cone 26 includes a central opening 28 which rotatably receives a depending central hub 30 of the platform 14. The upper surface of the cone 26 surrounding the opening 28, and the lower surface of the platform 14 surrounding the hub 30, are provided with layers 32 of a material having a low coefficient of friction, such as tetrafluoroethylene or the like. The layers 32 serve as bearing surfaces during rotation of the platform 14 relative to the base 12.

The platform 14 is also preferably molded of plastic or the like and includes an upper circular plate 34 which is integral with a cylindrical circumferential wall 36. The lower portion of the wall 36 includes a radially inwardly oriented circumferential portion constituting a toothed rack 38 with which is meshed or drivingly engaged a pinion 40 mounted to the output shaft 42 of an electric motor 44 constituting a part of the drive means 16. The motor 44 is suitably secured to the base wall 24 by mounting screws and a mounting bracket 46.

Figure 5:
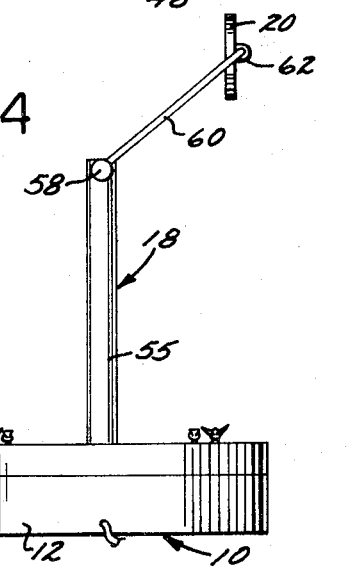
FIG. 5 is an enlarged view taken along the line 5—5 of FIG. 2.
Figure 5:
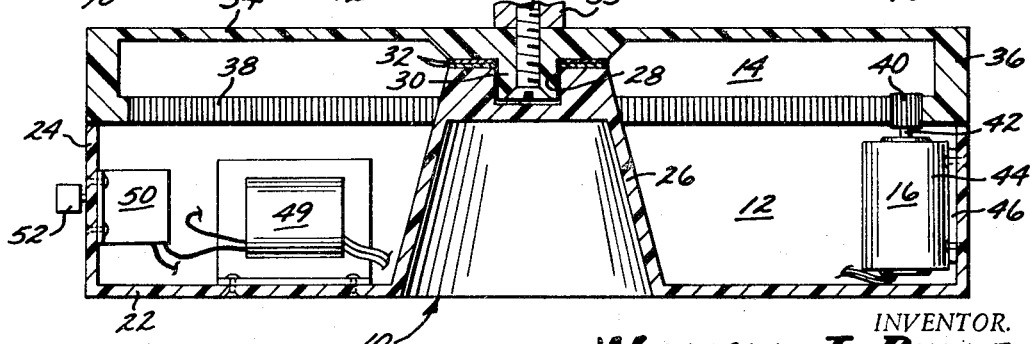

As best seen in FIG. 5, power to drive the electric motor 44 is obtained by inserting a plug 48 into a usual electrical outlet, and this power is fed through a conventional transformer 49 which steps down the voltage, and a conventional rheostat 50 is incorporated in the circuit to vary the current applied to the motor 44. Adjustment of the current is controlled by movement of a rheostat control 52 projecting through a circumferentially extending slot 54 in the base wall 24. The transformer 49 is secured by suitable fasteners to the base plate 22, and the rheostat 50 is secured by similar fasteners to the base side wall 24.

Upon energization of the motor 44, the pinion 40 rotates and effects accompanying rotation of the platform 14, the speed of rotation of the platform 14 being controlled by adjusting the position of the rheostat control 52.

The bird support 18 comprises a vertically oriented post 55 which is fixed at its lower end to the center of the platform plate 34 by a countersunk machine screw 56 which extends upwardly through the platform hub 30 and into a threaded opening provided in the lower end of the post 55.

A horizontal bar 58 is disposed through a horizontally oriented opening in the upper extremity of the post 55 and is glued or otherwise fixed in position. A pair of arms 60 extend upwardly and away from the opposite extremities of the bar 58 and include inwardly formed upper ends which project into a horizontally oriented pivot tube 62 attached to the rear surface of the mounting frame for the mirror 20. With this arrangement the mirror 20 may be adjustably tilted about a horizontal axis by pivoting it relative to the arms 60.

In operation, the user inserts the plug 48 into an electrical outlet, and moves the rheostat control 52 to energize the motor 44 for rotation of the platform 14. This carries the bird support 18 with it and this rotation together with the changing images of the surroundings appearing in the mirror 20 excites and amuses a bird on the bar 58. The combination of the reflected images in the mirror, and the rotation occasioned by rotation of the platform 14, produces an effect upon the bird which is novel and entertaining.

Various modifications and changes may be made with regard to the foregoing detailed description without departing from the spirit of the invention.

I claim:

1. A rotating bird perch comprising:

a base;

a platform rotatably mounted to said base;

drive means operative to rotate said platform relative to said base and including switch means operable to render said drive means operative;

a bird support including an upstanding member carried by and rotatable with said platform;

a mirror; and means projecting from said support and mounting said mirror in spaced relation to said support whereby said mirror is rotatable with said support and a bird is enabled to perch on said support and see changing images in said mirror.

2. A rotating bird perch according to Claim 1 wherein said upstanding member comprises a vertical post and said support includes a horizontal bar attached to said post; and wherein said means projecting from said support include a pair of arms which extend from the opposite extremities of said bar and attach to said mirror for supporting said mirror.

3. A rotating bird perch according to claim 2 wherein said mirror is pivotable upon said arms.

4. A rotating bird perch according to claim 1 wherein said drive means comprises an electric motor mounted to said base; a toothed perimeter on said platform interior; and a drive gear mounted to the output shaft of said motor and meshed with said toothed perimeter for rotating said platform.

5. A rotating bird perch according to Claim 4 wherein said switch means includes speed control means operative to vary the rate of operation of said drive means and consequently the speed of rotation of said support.

* * * * *